US010351028B2

(12) United States Patent
Iyer et al.

(10) Patent No.: US 10,351,028 B2
(45) Date of Patent: Jul. 16, 2019

(54) SEAT ASSEMBLY WITH ENERGY ABSORBER

(71) Applicant: GM GLOBAL TECHNOLOGY OPERATIONS LLC, Detroit, MI (US)

(72) Inventors: Anand V. Iyer, Bangalore (IN); Shrikant A. Gholap, Bangalore (IN)

(73) Assignee: GM Global Technology Operations LLC., Detroit, MI (US)

( * ) Notice: Subject to any disclaimer, the term of this patent is extended or adjusted under 35 U.S.C. 154(b) by 343 days.

(21) Appl. No.: 15/218,454

(22) Filed: Jul. 25, 2016

(65) Prior Publication Data

US 2018/0022243 A1 Jan. 25, 2018

(51) Int. Cl.
| | |
|---|---|
| *B60N 2/07* | (2006.01) |
| *B60N 2/427* | (2006.01) |
| *B60N 2/42* | (2006.01) |
| *B60N 2/06* | (2006.01) |
| *B60R 22/26* | (2006.01) |

(52) U.S. Cl.
CPC ........... *B60N 2/42709* (2013.01); *B60N 2/06* (2013.01); *B60N 2/0732* (2013.01); *B60N 2/4214* (2013.01); *B60R 22/26* (2013.01)

(58) Field of Classification Search
CPC B60N 2/42709; B60N 2/4214; B60N 2/0732; B60N 2/06; B60R 22/26
USPC .......................................... 297/216.1, 216.17
See application file for complete search history.

(56) References Cited

U.S. PATENT DOCUMENTS

| | | | | |
|---|---|---|---|---|
| 2,201,280 | A * | 5/1940 | Yantes ............... | B61D 33/0064 297/216.1 X |
| 6,257,663 | B1 * | 7/2001 | Swierczewski ...... | B60N 2/4214 297/216.16 |
| 6,672,667 | B1 * | 1/2004 | Park ................... | B60N 2/42754 297/216.1 |
| 7,293,830 | B2 * | 11/2007 | Marotta ............... | B60N 2/503 297/216.17 |
| 2011/0018320 | A1 * | 1/2011 | Schneider ............... | B60N 2/24 297/216.17 X |

FOREIGN PATENT DOCUMENTS

| | | |
|---|---|---|
| CN | 2194850 Y | 4/1995 |
| CN | 2414003 Y | 1/2001 |
| CN | 2737613 Y | 11/2005 |
| CN | 101428689 A | 5/2009 |
| CN | 105480019 A | 4/2016 |

* cited by examiner

*Primary Examiner* — Anthony D Barfield
(74) *Attorney, Agent, or Firm* — Quinn IP Law

(57) ABSTRACT

A seat assembly includes a lower rail track configured for attachment to a floor of the vehicle. An upper rail track is coupled to the lower rail track. A seat riser is attached to the upper rail track. A seat cushion and a seat back are each coupled to and supported by the seat riser. A seatbelt is attached to the seat riser. The seatbelt is operable to transfer a tensile force to the seat riser. An energy absorber interconnects the upper rail track and seat riser. The energy absorber is operable to reduce energy transfer between the seat riser and the upper rail track in response to the seatbelt applying the tensile force to the seat riser.

16 Claims, 3 Drawing Sheets

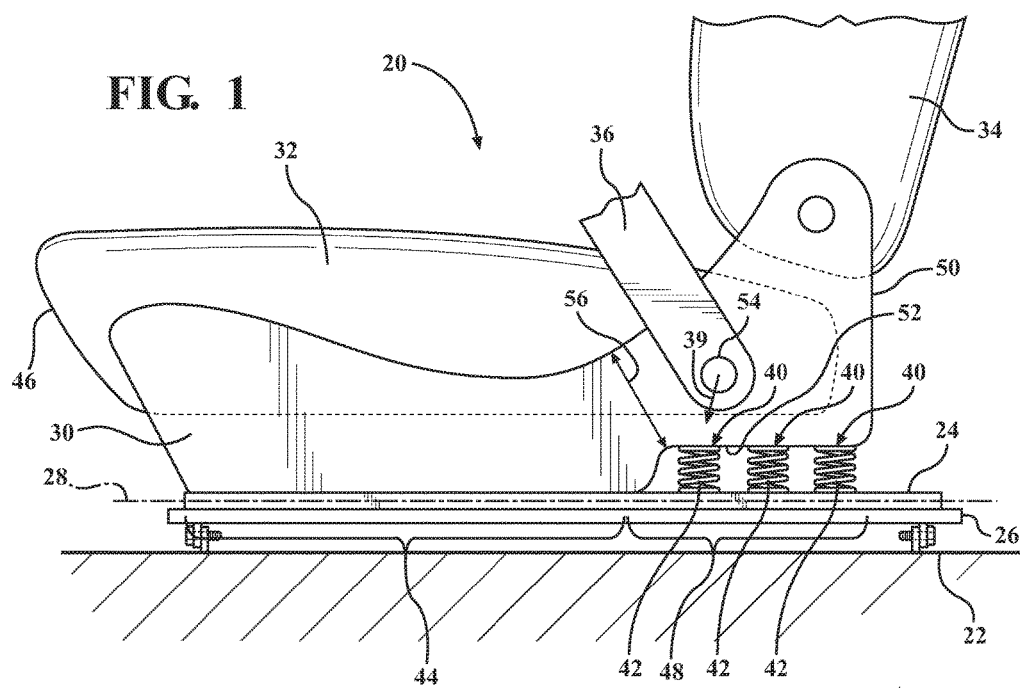
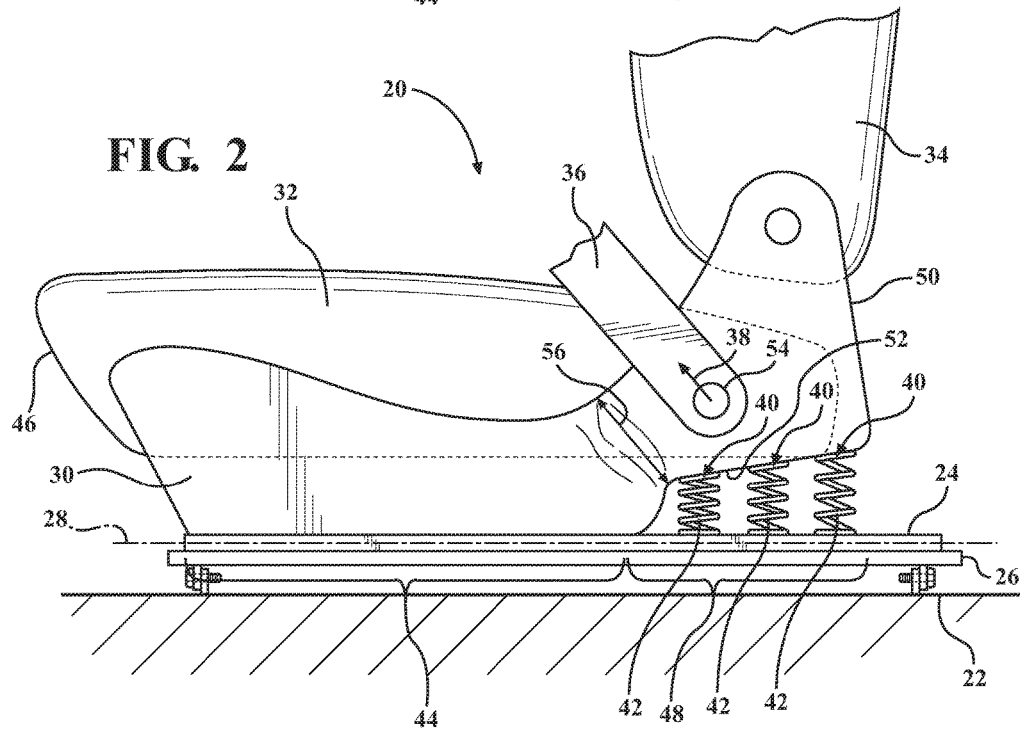

SEAT ASSEMBLY WITH ENERGY ABSORBER

TECHNICAL FIELD

The disclosure generally relates to a seat assembly for a vehicle.

BACKGROUND

Vehicles typically include one or more seat assemblies. Each seat assembly includes a structure or frame that is attached to a structural element of the vehicle, such as a floor pan or frame member. The structure of the seat assembly supports a seat cushion and a seatback. A seatbelt is attached to the structure. In response to a sudden deceleration, the seatbelt may apply a tensile force to the seat structure. The seat structure in turn transfers the applied tensile force to the structural element of the vehicle.

SUMMARY

A seat assembly is provided. The seat assembly includes a first structural member and a second structural member. The second structural member is attached to the first structural member. An energy absorber interconnects the first structural member and the second structural member. The energy absorber is operable to reduce energy transfer between the first structural member and the second structural member in response to a force applied to the second structural member.

A seat assembly for a vehicle is also provided. The seat assembly includes a lower rail track configured for attachment to a floor of the vehicle. An upper rail track is coupled to the lower rail track. The upper rail track is moveable relative to the lower rail track in an axial direction along a longitudinal axis. A seat riser is attached to the upper rail track. A seat cushion is coupled to and supported by the seat riser. A seatback is coupled to and supported by the seat riser. An energy absorber interconnects the upper rail track and seat riser. The energy absorber is operable to reduce energy transfer between the seat riser and the upper rail track in response to a force applied to the seat riser.

Accordingly, the energy absorber absorbs energy, and thereby reduces the amount of energy that is transferred from the second structural member, e.g., the seat riser, to the first structural member, e.g., the upper rail track, in response to the seatbelt applying the tensile force to the second structural member. By absorbing some of the energy that is applied to the second structural member by the seatbelt, the energy absorber reduces the amount of energy that is transferred to the first structural member. Additionally, the energy absorber may operate as a shock absorber during normal vehicle operation, to increase the ride comfort to a seated occupant.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic side view of a seat assembly showing an energy absorber in a pre-elongated position.

FIG. 2 is a schematic side view of the seat assembly, showing the energy absorber in an elongated position in response to a tensile force being applied by a restraint.

DETAILED DESCRIPTION

Figure 3:
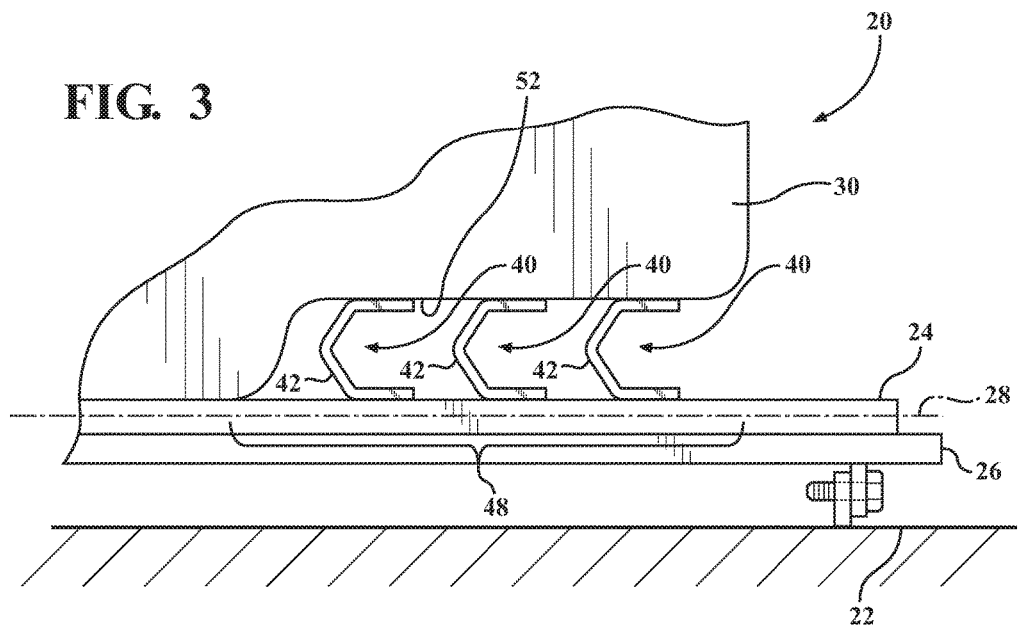
FIG. 3 is a schematic partial side view of the seat assembly showing a first alternative embodiment of the energy absorber.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a seat assembly is generally shown at 20. Referring to FIGS. 1 and 2, the seat assembly 20 is for a vehicle. The vehicle may include any form of moveable platform, such as but not limited to an automobile, a truck, a tractor, an ATV, an UTV, a plain, a train, etc. The vehicle includes a structural element, such as but not limited to a floor 22, for example, to which the seat assembly 20 is attached.

The seat assembly 20 includes, but is not limited to, a first structural member and a second structural member. The first structural member and the second structural member cooperate to form what may be referred to as a frame or structural support of the seat assembly 20, and cooperate to support the other various components of the seat assembly 20.

The first structural member is configured for attachment to the structural element of the vehicle, e.g., the floor 22 of the vehicle. The first structural member may include one or more components that are attached together, or may alternatively be a single component. For example, the first structural member is depicted in the Figures and described herein as an upper rail track 24. However, it should be appreciated that the first structural member may include some other structural element of the seat assembly 20, may be described by some other term, and may not necessarily be defined as the upper rail track 24. As such, the exemplary embodiment of the first structural member being the upper rail track 24 is provided merely for exemplary and descriptive purposes, and the scope of the claims should not be limited to the first structural member being only the upper rail track 24.

In the exemplary embodiment shown in the Figures and described herein, the seat assembly 20 further includes a lower rail track 26. The lower rail track 26 is attached to the upper rail track 24, and attaches the upper rail track 24 to the floor 22 of the vehicle. The upper rail track 24 is moveable in an axial direction along a longitudinal axis 28 relative to the lower rail track 26. The specific manner in which the upper rail track 24 and the lower rail track 26 are connected to each other and enable axial movement of the upper rail track 24 relative to the lower rail track 26 along the longitudinal axis 28 is not pertinent to the teachings of this disclosure, and are therefore not described in detail herein.

The second structural member is attached to the first structural member. The second structural element may include one or more components that are attached together, or may alternatively be a single component. For example, the second structural member is depicted in the Figures and described herein as seat riser 30. However, it should be appreciated that the second structural member may include some other structural element of the seat assembly 20, may be described by some other term, and may not necessarily be defined as the seat riser 30. As such, the exemplary embodiment of the second structural member being the seat riser 30 is provided merely for exemplary and descriptive purposes, and the scope of the claims should not be limited to the second structural member being only the seat riser 30.

The exemplary embodiment of the seat assembly 20 shown in the Figures and described herein includes a seat cushion 32 and a seatback 34. Both the seat cushion 32 and the seatback 34 are coupled to and supported by the seat riser 30. The specific construction of the seat cushion 32 and the seatback 34, as well as the manner in which the seat cushion 32 and the seatback 34 are attached to the seat riser 30 are not pertinent to the teachings of this disclosure, and are therefore not described in detail herein.

The seat assembly 20 further includes a restraint 36. The restraint 36 is depicted in the Figures and described herein as a seat belt 36. However, it should be appreciated that the restraint 36 may include a device or system other than the exemplary embodiment of the seat belt 36 described herein. The seat belt 36 is attached to the seat riser 30, i.e., the second structural member. The seat belt 36 may be attached to the seat riser 30 in any suitable manner, such as with a bolt or other similar fastener. The specific manner in which the seat belt 36 is attached to the seat riser 30 is not pertinent to the teachings of this disclosure, and is therefore not described in detail herein. The restraint 36, e.g., the seat belt 36, is operable to transfer a tensile force 38 to the seat riser 30. For example, a sudden deceleration of the vehicle may cause an occupant of the seat assembly 20 to impart a force into the restraint 36. The restraint 36 in turn imparts the force, i.e., the tensile force 38, to the seat riser 30. The tensile force is indicated in FIG. 2 by arrow 38. It should be appreciated that a compressive force may also be applied to the seat riser 30. The compressive force is indicated in FIG. 1 by arrow 39.

Referring to FIGS. 1 and 2, the seat assembly 20 includes an energy absorber 40. The energy absorber 40 interconnects the second structural member, e.g., the seat riser 30, and the first structural member, e.g., the upper rail track 24. The energy absorber 40 is operable to reduce energy transfer between the seat riser 30 and the upper rail track 24 in response to the restraint 36 applying the tensile force 38 to the seat riser 30.

Figure 4:
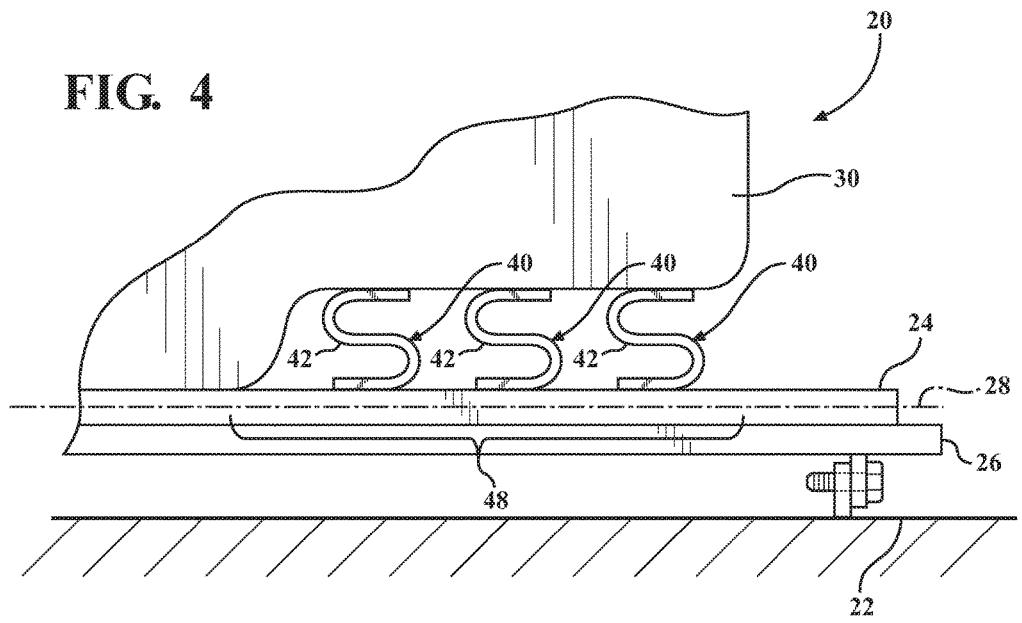
FIG. 4 is a schematic partial side view of the seat assembly showing a second alternative embodiment of the energy absorber.

The energy absorber 40 may include any device capable of absorbing energy in response to the tensile force 38. For example, the energy absorber 40 may include a spring 42. As shown in FIGS. 1 and 2, the energy absorber 40 is shown as a plurality of coil springs 42. Alternatively, as shown in FIGS. 3 and 4, the energy absorber 40 includes a plurality of springs 42 formed from a spring steel plate. The spring steel plate is formed into a shape having a cross section parallel to the longitudinal axis 28 that defines at least one channel. For example, referring to FIG. 3, the energy absorbers 40 are shown as springs 42 having a single channel, and forming a generally "C" shaped cross section. Referring to FIG. 4, the energy absorbers 40 are shown as springs 42 having two channels, and forming a generally "S" shaped cross section.

While the energy absorber(s) 40 are shown in FIGS. 1 through 4 and described herein as different types and/or configurations of a spring 42, it should be appreciated that the energy absorber 40 may be configured in some other manner, and may include a device other than a spring 42. Accordingly, the energy absorber 40 should not be limited to a spring 42, but should be interpreted more broadly to include other devices capable of absorbing energy in response to either the tensile force 38, or the compressive force 39.

Figure 5:
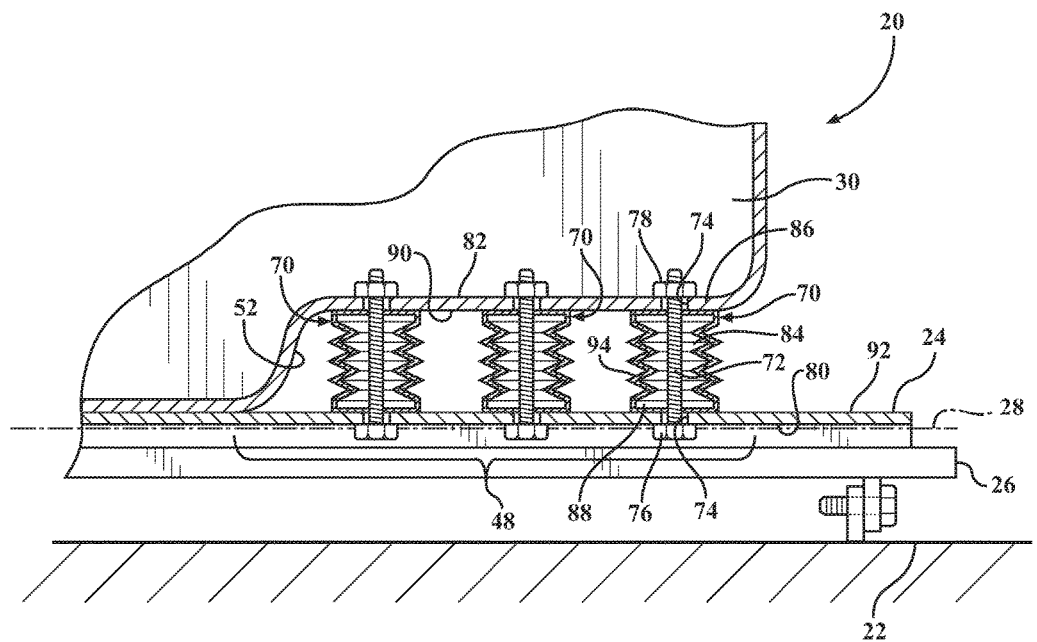
FIG. 5 is a schematic partial cross sectioned side view of the seat assembly showing a third alternative embodiment of the energy absorber.

For example, referring to FIG. 5, a third alternative embodiment of the energy absorber is generally shown at 70. The third alternative embodiment of the energy absorber 70 does not include a spring. Instead, the energy absorber 70 includes components that are intended to deform in response to an applied force, and thereby absorb energy during the deformation process. Energy that is absorbed or used by the energy absorber 70 during deformation is therefore not available to be transferred to the first structural member.

Referring to FIG. 5, the energy absorber 70 includes a shaft 72 extending between the first structural member 24 and the second structural member 30. More specifically, the shaft 72 extends through a respective aperture 74 in each of the first structural member, e.g., the upper rail track 24, and the second structural member, e.g., the seat riser. The shaft 72 includes a lower stop 76 and an upper stop 78. The lower stop 76 is disposed adjacent a lower surface 80 of the upper rail track 24. The lower stop 76 is not fixedly attached to the upper rail track 24. The upper stop 78 is disposed adjacent an upper surface 82 of the seat riser 30. The upper stop 78 is not fixedly attached to the seat riser 30. Accordingly, because the lower stop 76 is not fixedly attached to the upper rail track 24, and the upper stop 78 is not fixedly attached the seat riser 30, the upper stop 78 and the lower stop 76 may cooperate to limit or resist separation of the seat riser 30 and the upper rail track 24, i.e., movement away from each other, but do not resist or limit movement of the seat riser 30 and upper rail track 24 toward each other. The shaft 72, the upper stop 78, and the lower stop 76, may include a bolt and nut combination, or some other similar device. However, it should be appreciated that the shaft 72, upper stop 78, and lower stop 76 may be formed and/or manufactured in some other manner, other than the exemplary bolt and nut combination. Preferably, the shaft 72 is manufactured from a metal. However, it should be appreciated that the shaft 72 may be manufactured from a material other that a metal, which requires significant energy to deform, yet yields significantly prior to fracturing.

The energy absorber 70 further includes a sleeve 84. The sleeve 84 is disposed between the first structural member 24 and the second structural member 30. The sleeve 84 includes an upper end 86 and a lower end 88. The upper end 86 is disposed adjacent to a lower surface 90 of the second structural member 30. The lower end 88 is disposed adjacent to an upper surface 92 of the first structural member 24. Preferably, the upper end 86 of the sleeve 84 is fixedly attached to the seat riser 30, and the lower end 88 of the sleeve 84 is fixedly attached to the upper rail track 24. The sleeve 84 may be fixedly attached to the upper rail track 24 and/or the seat riser 30 in any suitable manner, such as but not limited to, welding, adhesion, or by mechanical fastener.

The sleeve 84 includes at least one convolute 94. Preferably, the sleeve 84 includes a plurality of convolutes 94. Each convolute 94 extends annularly around a perimeter of the sleeve 84, to form an accordion like structure. The convolutes 94 help control deformation of the sleeve 84 in an axial direction, and increase the length that the sleeve 84 may be elongated in response to an applied force. Preferably, the sleeve 84 is manufactured from a metal, such as steel. However, it should be appreciated that the sleeve 84 may be manufactured from a material other that a metal, which requires significant energy to deform, yet yields significantly prior to fracturing.

In response to the tensile force 38 being applied to the seat riser 30, the tensile force 38 pulls the seat riser 30 and the upper rail track 24 away from each other, thereby pulling on the energy absorber 70. The applied tensile force 38 causes the shaft 72 and the sleeve 84 of the energy absorber 70 to bend, stretch, or otherwise deform. The deformation of the shaft 72 and/or the sleeve 84 requires energy. Accordingly, the energy that is used to deform the shaft 72 and/or the sleeve 84 is absorbed, and is therefore not transferred to the upper rail track 24.

In response to the compressive force 39 being applied to the seat riser 30, the compressive force 39 urges the seat riser 30 toward the upper track rail 24. The shaft 72 does not resist the movement of the seat riser 30 and the upper track rail 24 toward each other. However, the sleeve 84 does resist movement of the seat riser 30 and the upper track rail 24 toward each other. The applied compressive force 39 causes the sleeve 84 to compress and deform. The deformation of the sleeve 84 requires energy. Accordingly, the energy that is used to deform the sleeve 84 in response to the compressive force 39 is absorbed, and is therefore not transferred to the upper rail rack.

Referring to FIGS. 1 and 2, and as noted above, the first structural member, e.g., the upper rail track 24, and the second structural member, e.g., the seat riser 30, are connected to each other. The upper rail track 24 and the seat riser 30 are directly connected to each other in a first joint region 44. The first joint region 44 extends a distance along the longitudinal axis 28, and generally includes a forward end 46 of the seat assembly 20. As used herein, the term "directly connected" is defined as being connected to each other without any intervening components. The upper rail track 24 and the seat riser 30 may be directly connected to each other in any suitable manner. For example, the seat riser 30 and the upper rail track 24 may be welded together, or jointed together by a fastener or other device.

The upper rail track 24 and the seat riser 30 are interconnected by the energy absorber 40 in a second joint region 48. The second joint region 48 extends a distance along the longitudinal axis 28, and generally includes a rearward end 50 of the seat assembly 20. Accordingly, because the energy absorber 40 interconnects the upper rail track 24 and the seat riser 30 within the second joint region 48, the upper rail track 24 and the seat riser 30 are not directly connected together within the second joint region 48. In order to accommodate the energy absorber 40, the seat riser 30 forms a pocket 52 or space disposed between the seat riser 30 and the upper rail track 24. The energy absorber 40 is disposed within the pocket 52, between the sear riser and the upper rail track 24.

The restraint 36, e.g., the seat belt 36, is attached to the seat riser 30 by a restraint connection 54. As noted above, the specific manner in which the restraint 36 is attached to the seat riser 30, i.e., the restraint connection 54, is not pertinent to the teachings of this disclosure. However, it should be noted that the restraint connection 54 is located within the second joint region 48 along the longitudinal axis 28. Accordingly, the restraint 36 is attached to the seat riser 30 within the second joint region 48, which is the region along the longitudinal axis 28 in which the energy absorber 40 interconnects the seat riser 30 and the upper rail track 24.

The seat riser 30 may include a thinned section 56, which is generally disposed between the first joint region 44 and the second joint region 48 along the longitudinal axis 28. The thinned section 56 may be at least partially formed by the pocket 52. The thinned section 56 includes a portion of the seat riser 30 having the lowest bending stiffness of the seat riser 30. The thinned section 56 is operable to yield or bend in response to a force applied to the seat riser 30 e.g., the tensile force 38 or the compressive force 39. The restraint connection 54 is located rearward of the thinned section 56, so that the tensile force 38 generates a moment in the seat riser 30 relative to the thinned section 56. The thinned section 56, being the location of the lowest bending stiffness of the seat riser 30, forms a hinge area about which the portion of the seat riser 30 located in the second joint region 48 may rotate or bend relative to the portion of the seat riser 30 located in the first joint region 44, when the force is applied at the restraint 36 location.

As an example, referring to FIG. 2, as the tensile force 38 is applied to the seat riser 30, the portion of the seat riser 30 located within the second joint region 48 moves relative to the upper rail track 24. It should be appreciated that movement of the second joint region 48 of the seat riser 30 is accompanied by a yielding or bending of the seat riser 30 in the general region of the thinned section 56. The second joint region 48 of the seat riser 30 moves away from the upper rail track 24 so that the energy absorber 40 may elongate. It should be appreciated that energy is required to elongate the energy absorber 40. As such, the more the energy absorber 40 is elongated, the more energy is absorbed and/or dissipated, which is therefore not transferred to the first structural member, e.g., the upper rail track 24. Accordingly, elongation of the energy absorber 40 reduces the amount of energy transferred from the seat riser 30 to the upper rail track 24.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A seat assembly, the seat assembly comprising:
a first structural member;
a second structural member attached to the first structural member;
an energy absorber interconnecting the first structural member and the second structural member, and operable to reduce energy transfer between the first structural member and the second structural member in response to a force applied to the second structural member;
wherein the energy absorber includes a shaft extending between the first structural member and the second structural member;
wherein the energy absorber includes a sleeve disposed between and attached to the first structural member and the second structural member; and
wherein the sleeve includes at least one convolute extending annularly around a perimeter of the sleeve.

2. The seat assembly set forth in claim 1, wherein the shaft includes a lower stop disposed adjacent a lower surface of the first structural member, and an upper stop disposed adjacent an upper surface of the second structural member.

3. The seat assembly set forth in claim 2, wherein the lower stop is not fixedly attached to the first structural member, and the upper stop is not fixedly attached to the second structural member.

4. The seat assembly set forth in claim 2, wherein the sleeve includes an upper end disposed adjacent to a lower surface of the second structural member, and a lower end disposed adjacent to an upper surface of the first structural member.

5. The seat assembly set forth in claim 4, wherein the upper end of the sleeve is fixedly attached to the second structural member, and the lower end of the sleeve is fixedly attached to the first structural member.

6. The seat assembly set forth in claim 1, wherein the first structural member and the second structural member are directly connected to each other in a first joint region.

7. The seat assembly set forth in claim 6, wherein the first structural member and the second structural member are interconnected by the energy absorber in a second joint region.

8. The seat assembly set forth in claim 7, wherein the second joint region is disposed adjacent a rearward end of the seat assembly along a longitudinal axis.

9. The seat assembly set forth in claim 7, further comprising a restraint attached to the second structural member at a restraint connection, wherein the restraint connection is disposed within the second joint region.

10. A seat assembly for a vehicle, the seat assembly comprising:
    a lower rail track configured for attachment to a floor of the vehicle;
    an upper rail track coupled to the lower rail track and moveable relative to the lower rail track in an axial direction along a longitudinal axis;
    a seat riser attached to the upper rail track by an energy absorber, wherein the energy absorber is operable to reduce energy transfer between the seat riser and the upper rail track in response to a force applied to the seat riser;
    wherein the upper rail track and the seat riser are directly connected to each other in a first joint region;
    a seat cushion coupled to and supported by the seat riser; and
    a seatback coupled to and supported by the seat riser.

11. The seat assembly set forth in claim 10, wherein the energy absorber includes a spring disposed between and interconnecting the upper rail track and the seat riser.

12. The seat assembly set forth in claim 10, wherein the energy absorber includes:
    a shaft extending through a respective aperture in each of the upper rail track and the seat riser;
    a lower stop disposed adjacent a lower surface of the upper rail track; and
    an upper stop disposed adjacent an upper surface of the seat riser.

13. The seat assembly set forth in claim 12, wherein the energy absorber includes a sleeve disposed between the upper rail track and the seat riser, and having an upper end attached to the upper rail track, and a lower end attached to the seat riser.

14. The seat assembly set forth in claim 13, wherein the sleeve includes at least one convolute extending annularly around a perimeter of the sleeve.

15. The seat assembly set forth in claim 10, wherein the upper rail track and the seat riser are interconnected by the energy absorber in a second joint region.

16. The seat assembly set forth in claim 15, wherein the seat riser includes a thinned section disposed generally between the first joint region and the second joint region and operable to yield in response to the force to allow the second joint region of the seat riser to move relative to the upper rail track, so that the energy absorber may elongate or contract to absorb energy.

* * * * *